(12) United States Patent
Bihannic et al.

(10) Patent No.: US 10,270,889 B2
(45) Date of Patent: Apr. 23, 2019

(54) ENHANCED PROTOCOL CONVERSION IN A TELECOMMUNICATIONS NETWORK FOR PROVIDING SERVICES HAVING IMPROVED QUALITY OF SERVICE

(71) Applicant: ORANGE, Paris (FR)

(72) Inventors: Nicolas Bihannic, Trebeurden (FR); Najib Bajdouri, Massy (FR); Julien Besse, Malakoff (FR)

(73) Assignee: Orange, Paris (FR)

( * ) Notice: Subject to any disclaimer, the term of this patent is extended or adjusted under 35 U.S.C. 154(b) by 224 days.

(21) Appl. No.: 15/023,732

(22) PCT Filed: Sep. 19, 2014

(86) PCT No.: PCT/FR2014/052336
§ 371 (c)(1),
(2) Date: Mar. 22, 2016

(87) PCT Pub. No.: WO2015/044566
PCT Pub. Date: Apr. 2, 2015

(65) Prior Publication Data
US 2016/0234349 A1     Aug. 11, 2016

(30) Foreign Application Priority Data

Sep. 25, 2013    (FR) ..................... 13 59253

(51) Int. Cl.
*G06F 15/16*     (2006.01)
*H04L 29/06*     (2006.01)
(Continued)

(52) U.S. Cl.
CPC .......... *H04L 69/08* (2013.01); *H04L 41/5045* (2013.01); *H04L 41/5054* (2013.01);
(Continued)

(58) Field of Classification Search
CPC . H04L 69/08; H04L 41/5045; H04L 41/5054; H04L 65/1069; H04L 65/80;
(Continued)

(56) References Cited

U.S. PATENT DOCUMENTS

2007/0005801 A1* 1/2007 Kumar .................... H04L 63/08
                                                    709/238
2008/0101339 A1* 5/2008 Forbes .................... H04L 12/66
                                                    370/352
2014/0348176 A1* 11/2014 Sprague ................ H04L 67/327
                                                    370/401

OTHER PUBLICATIONS

3rd Generation Partnership Project, "3rd Generation Partnership Project; Technical Specification Group Core Network and Terminals; Study on XML based access of AF to the PCRF (Release 12)", 3GPP TR 29.817, v0.2.0, Aug. 2013, 47 pages.
(Continued)

*Primary Examiner* — Richard G Keehn
(74) *Attorney, Agent, or Firm* — Drinker Biddle & Reath LLP

(57) ABSTRACT

A method for processing data in a telecommunications network, the method being implemented in a first server of the telecommunications network and comprising the following steps: receiving a first session initiation request from a second server of a service provider, the first request comprising a service provider identifier; obtaining, from the service provider identifier, a set of technical parameters of the network adapted to a quality of service subscribed to by the service provider identified in the first request; generating at least one second session initiation request, the second request comprising the set of adapted technical parameters; transmitting said at least one second session initiation request to at least one resource control server of the telecommunications network.

15 Claims, 2 Drawing Sheets

(51) Int. Cl.
    *H04L 29/08*        (2006.01)
    *H04L 12/24*        (2006.01)
(52) U.S. Cl.
    CPC .......... *H04L 65/1069* (2013.01); *H04L 65/80* (2013.01); *H04L 67/02* (2013.01); *H04L 67/2804* (2013.01); *H04L 67/2895* (2013.01)
(58) Field of Classification Search
    CPC .. H04L 67/02; H04L 67/2804; H04L 67/2895
    See application file for complete search history.

(56)                References Cited

OTHER PUBLICATIONS

3rd Generation Partnership Project, "3rd Generation Partnership Project; Technical Specification Group Core Network and Terminals; Study on XML based access of AF to the PCRF (Release 12)", 3GPP TR 29.817, v0.1.0, Jun. 2013, 36 pages.
ETSI, "Technical Specification; Universal Mobile Telecommunications System (UMTS); LTE; Policy and Charging Control over Rx Reference Point," 3GPP TS 29.214, v11.8.0, Release 11, Mar. 15, 2013, 56 pages.
Orange, "Discussion on the scope of the TR, regarding (not Diameter-based) interaction between AF and PCRF," 3GPP draft, C3-131128, 3GPP, vol. CT WG3, retrieved from internet website <http://www.3gpp.org/ftp/tsg_ct/WG3_interworking_ex-CN3/TSGC3_74_Vienna/Docs/> on Jul. 29, 2013, 4 pages.

* cited by examiner

ENHANCED PROTOCOL CONVERSION IN A TELECOMMUNICATIONS NETWORK FOR PROVIDING SERVICES HAVING IMPROVED QUALITY OF SERVICE

CROSS-REFERENCE TO RELATED APPLICATIONS

This application is the U.S. national phase of the International Patent Application No. PCT/FR2014/052336 filed Sep. 19, 2014, which claims the benefit of French Application No. 13 59253 filed Sep. 25, 2013, the entire content of which is incorporated herein by reference.

BACKGROUND

The present invention relates to the processing of data in a telecommunications network, particularly in a mobile network.

It more particularly relates to the cooperation between third-party service providers and an operator of a telecommunications network.

The amount and volume of digital content available on IP ("Internet Protocol")-based mobile telecommunications networks are growing exponentially.

Mobile network operators are looking to offer attractive technical solutions for requesting access to the resources of a telecommunications network, to third-party service providers. Service providers can thus request a certain quality of service for the transport of data of the service provider in the data communications network.

The main issues for the network operator are allowing the service provider to specify the network resource requirements for a given service, and implementing network mechanisms to better control the resources needed for this service.

New functionalities such as PCC ("Policy and Charging Control") are described in the 3GPP standards. These functionalities have been or are being deployed by telecommunications network operators. Among the various features of PCC, it is possible for a service provider to request a certain quality of service for the current service in the telecommunications network. Such a request requires sending a request over an Rx interface (defined in the standard "*Technical Specification Group Core Network and Terminals; Policy and Charging Control over Rx reference point*", TS 29-214, Version 11.8.0 of Mar. 15, 2013) which uses a network protocol called Diameter.

Such a protocol choice is effective in meeting network operator requirements in setting up the network resources for the requested service. However, such a protocol is not suitable for use by third-party service providers.

To improve the interface between the service provider and the network operator, the 3GPP standard "*Study on XML based access of AF to the PCRF,*" TR29-817, version 0.1.0 of June 2013, proposes assessing the value of an XML-based web protocol support to supplement the current Diameter protocol.

For this purpose, a protocol converter (PC) of the network is able to communicate with service providers via an XML interface, and with a PCC server via the Rx interface.

Such a solution requires that the service provider specify, in an XML file, all necessary attributes for the allocation of resources by the mobile network operator. The protocol converter then receives the XML file containing a set of values for technical parameter and initiates a message that contains the values of these parameters using the Diameter protocol, to enable transmission of the message to the PCC server.

To initiate the message according to the Diameter protocol, the protocol converter establishes a one-to-one correspondence between the parameter values received via the XML interface and the values indicated in the Rx interface message.

Such a solution therefore requires that the third-party service provider indicate in the XML file all the parameters necessary for the Rx interface, which requires technical expertise by the service provider in understanding the technical parameters (such as the guaranteed maximum bitrate, etc.) and in configuring the values associated with these parameters.

However, the service provider does not necessarily have such technical expertise, which complicates access to the functionalities of the PCC server.

SUMMARY

The present invention improves the situation.

For this purpose, it proposes a method for processing data in a telecommunications network, the method being implemented in a first server of the telecommunications network and comprising the following steps:
- receiving a first session initiation request from a second server of a service provider, the first request comprising a service provider identifier;
- obtaining, from the service provider identifier, a set of technical parameters of the network that are adapted to a quality of service subscribed to by the service provider identified in the first request;
- generating a second session initiation request, the second request comprising the set of adapted technical parameters;
- transmitting the second session initiation request to a resource control server of the telecommunications network.

Thus, the invention proposes simplifying the interface between a first server, which may be the protocol converter described above, and a second server of a service provider.

Indeed, the service provider may not have sufficient technical expertise to define a request comprising a set of complex technical parameters specific to the telecommunications network. The invention therefore provides for the transmission of a first request comprising minimal data understandable to the service provider, and enriching this first request in the first server which belongs to the telecommunications network and has access to technical parameters specific to the network. Comprehension of the data included in the first request is thus improved, while the interface between the first server and the resource control server of the telecommunications network (which may be the previously introduced Rx interface) remains unchanged.

According to one embodiment of the invention, obtaining the set of technical parameters comprises accessing a database which maps each provider identifier among a plurality of provider identifiers to at least one set of technical parameters of the network.

Such an embodiment provides simplified access to the set of technical parameters, based on a unique identifier. The mapped data may be stored locally on the first server, which reduces the data to be exchanged with other network entities such as the information system, and reduces network congestion.

According to one embodiment, the first request may further comprise information concerning the requested quality of service level, a set of specific technical parameters may be associated with each requested quality of service level for a given service provider, and the method may further comprise, upon receipt of the first request comprising a service provider identifier and information concerning the requested quality of service level, a step consisting of generating a second session initiation request comprising the set of technical parameters adapted to the requested quality of service level and to the service provider identified in the first request.

Such an embodiment allows the service provider to differentiate its users into classes, each class corresponding to a given quality of service level. The proposed interface between the service provider and the first server is thus generic, and can be used for services offering different levels of quality as well as for services offering a single level of quality for all users.

Additionally or alternatively, the first request may further comprise a requested service identifier, a set of specific technical parameters may be associated with each requested service for a given service provider, and the method may further comprise, upon receipt of the first request comprising a service provider identifier and a requested service identifier, a step consisting of generating a second session initiation request comprising the set of technical parameters adapted to the requested service and to the service provider identified in the first request.

Such an embodiment allows providers that offer different types of service to differentiate the services by the requested level of quality in the network, the interface between the service provider and the first server remaining generic.

The method may further comprise, upon receipt of the first session initiation request, the following steps:
  creating a session identifier comprising timestamp data and a unique identifier;
  transmitting the session identifier to the second server of the service provider, enabling the second server to generate a quality of service change request for the identified session.

This embodiment allows the service provider to identify a user session with the first network server, and thus be able to address a quality of service change request for a current session (at the request of the user for example). The session identifier may, for example, further comprise a Diameter identifier of the service provider, this Diameter identifier having been generated by the resource control server.

In one embodiment, the first session initiation request may comprise a start time, and the second session initiation request may be sent to the resource control server at the start time contained in the first request.

The service provider can thus request the delayed creation of a session for one of its users. The invention may further allow introducing a change time in a quality of service change request for a current session, thereby delaying the change in the quality of service.

In one embodiment, the method comprises the following initial steps:
  receiving a request to subscribe to a desired quality of service in the telecommunications network, from the second server of the service provider, the request to subscribe comprising a service provider identifier and the quality of service being defined by a set of technical parameters of the network; and
  storing, in a database, a mapping between the service provider identifier and the set of technical parameters of the network.

This embodiment ensures that the enrichment of the first session initiation request is in accordance with a service offering previously subscribed to by the service provider.

According to one embodiment of the invention, the technical parameters may include one of the following elements, or any combination of the following elements:
  minimum bandwidth for upload and/or download;
  maximum bandwidth for upload and/or download;
  latency;
  jitter.

Such elements require complex technical knowledge and thus, according to the invention, are indicated in the initiation request by the first network server, not by the service provider as is the case in the prior art presented in the introductory section. In addition, a misunderstanding of technical parameters by the service provider could result in incorrect parameters being provided by the third-party service provider.

In one embodiment of the invention, the first request is an HTTP POST request comprising an XML file, the XML file comprising the first service provider identifier, and the second request may be a Diameter request to a resource control server of the telecommunications network.

Thus, this embodiment is compatible with the Diameter protocol used in PCC architectures, while an HTTP interface is used between the first and second servers, an interface that is accessible and known to service providers.

According to one embodiment, the method may further comprise the following steps:
  generating at least one third session initiation request, said at least one third request comprising the set of adapted technical parameters;
  transmitting said at least one third session initiation request to at least one second server of the telecommunications network, this server being distinct from the resource control server.

Thus, the protocol conversion performed by the first server allows generating third requests, intended for example for web optimization platforms (for content compression for example) or for content distribution platforms (as part of "caching" or "Content Delivery Network" (CDN) solutions). The first server is thus not exclusively dedicated to a resource control server, which simplifies the interface between the second server and network servers having functionalities other than controlling network resources.

A second aspect of the invention relates to a computer program comprising instructions for implementing the method according to any one of the preceding claims, when the program is executed by a processor.

A third aspect of the invention relates to a server for a telecommunications network, the server comprising:
  a receiving unit for receiving a first session initiation request from a server of a service provider, the first request comprising a service provider identifier;
  an obtaining unit for obtaining a set of technical parameters of the network that are adapted to a quality of service subscribed to by the service provider identified in the first request by the service provider identifier;
  a generation unit for generating a second session initiation request, the second request comprising the set of adapted technical parameters;
  a transmission unit for transmitting the second session initiation request to a resource control server of the telecommunications network.

According to one embodiment of the invention, the server may further comprise a database which maps each provider identifier among a plurality of provider identifiers to at least one set of technical parameters of the network.

Additionally or alternatively, the generation unit may be further configured to generate at least one third session initiation request, the third request comprising the set of adapted technical parameters, and the transmission unit may be further configured to transmit the at least one third session initiation request to at least one server of the telecommunications network that is distinct from the resource control server.

A fourth aspect of the invention relates to a system for processing data in a telecommunications network, the system comprising a first server of the telecommunications network, a second server of a service provider, and at least one resource control server, the first server being a server according to the third aspect of the invention.

BRIEF DESCRIPTION OF THE DRAWINGS

Other features and advantages of the invention will become apparent from the following detailed description and the accompanying drawings, in which.

DETAILED DESCRIPTION

Figure 1:
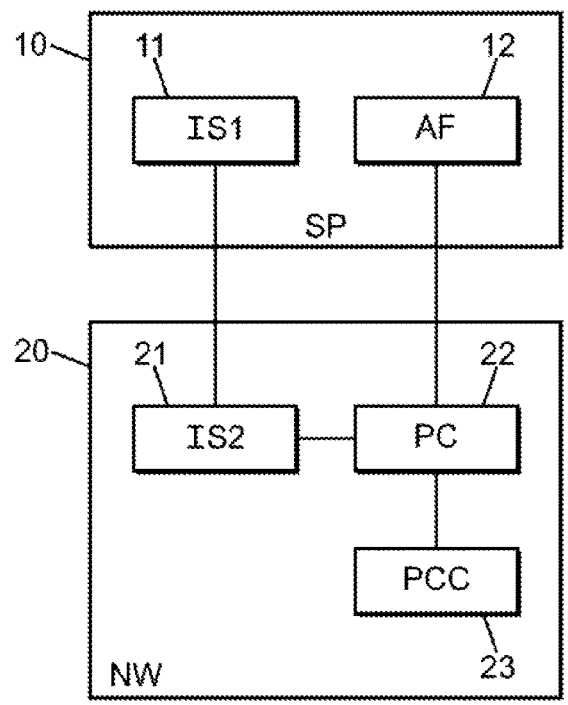
FIG. 1 illustrates a data processing system according to an embodiment of the invention.

FIG. 1 illustrates a data processing system according to an embodiment of the invention.

The data processing system comprises an information system 11 and a server 12 of a third-party service provider 10. Through the information system 11, the service provider 10 can subscribe to a quality of service offering from the network operator 20. The server 12 may include an application function and is able to access a telecommunications network 20 of an operator, by issuing requests using the HTTP protocol for example. As detailed below, an HTTP POST request containing an XML file may be sent to the telecommunications network 20 for the purposes of establishing a communication session for a user of the service provider.

The network 20 comprises an information system 21 and a server 22 enabling protocol conversions between the server 12 of the service provider 10 and a resource control server 23 of the network, such as a PCC server for example. No restrictions are placed on the resource control server 23, which alternatively may be a web optimization platform (for compression of content for example) or a content distribution platform (for "caching" or "Content Delivery Network" (CDN) solutions for example). In cases where the resource control server 23 is not a PCC server but is a web optimization server or CDN server, then the exchange protocol between network server 22 and server 23 may be a protocol other than Diameter.

In the rest of this document, the server 22 of the network 20 is called the first server 22 and the server 12 of the service provider is called the second server 12.

The information system 21 may be responsible for managing a client relationship with the service provider 10. To this end, it may:
 inform the service provider 10 of the functions supported by a given quality of service offering;
 process any request to subscribe, modify, or terminate a quality of service offering of the service provider 10;
 notify the service provider 10 of actions performed in the network 20 in response to requests made via the interface between the first server 22 and second server 12;
 send billing data and reports on usage of the aforementioned interface by the service provider 10.

As detailed in the introductory section, the interface between the first server 22 and second server 12 may be an HTTP software interface (hereinafter also called QoS API, for "Quality of Service Application Programming Interface"), while the interface between the first server 22 and the PCC server 23 may correspond to the Rx interface, using the Diameter protocol, as described in the abovementioned TS 29-214 standard.

The system illustrated in FIG. 1 comprises a single service provider 10. However, such an example is illustrative and the invention provides that a plurality of QoS API interfaces allows the first server 22 to serve a plurality of service providers.

Figure 2:
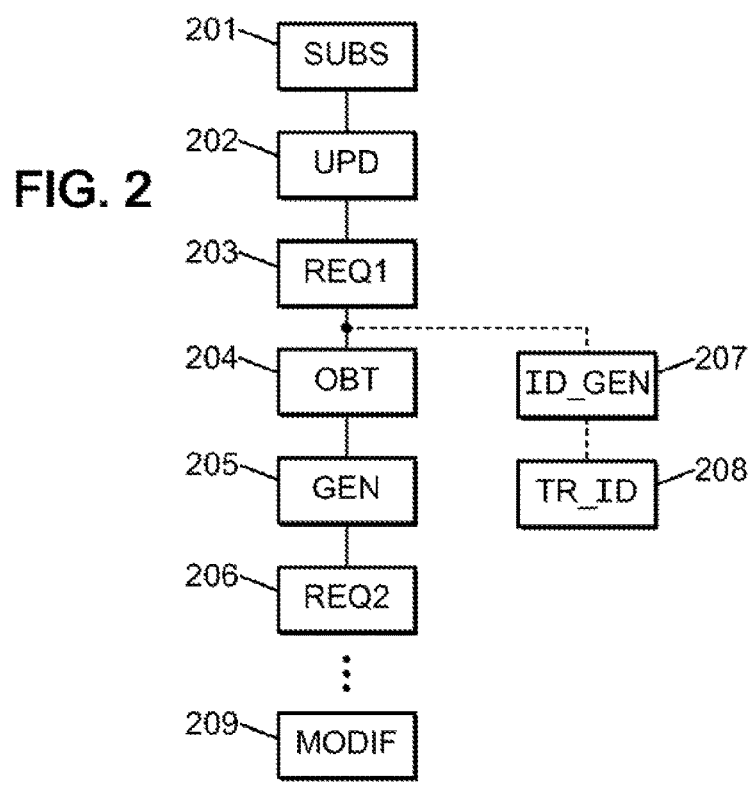
FIG. 2 is a diagram illustrating the steps of a data processing method according to an embodiment of the invention.

FIG. 2 is a diagram illustrating the steps of a method according to an embodiment of the invention.

In step 201, the service provider 10 subscribes to a quality of service offering from the network operator 20. Such a step may also correspond to a termination of a previously contracted quality of service offering. More generally, step 201 corresponds to the addition or removal of one or more options for a given quality of service offering, by sending a subscription request from the information system 11 of the service provider 10 to the information system 21 of the network 20. The subscription request includes a service provider identifier 10. A quality of service offering requested by the service provider 10 is associated, for the network 20, with a set of technical parameters adapted to the quality of service subscribed to by the service of the service provider 10 in the network 20. However, no restrictions are placed on how the subscription is achieved.

In step 202, the information system 21 of the network updates a database of the first server 22, communicating the set of technical parameters updated in the previous step and the identifier of the service provider 10 for which the set of technical parameters was updated. The set of technical parameters may comprise any combination of the following elements: minimum upload and/or download bandwidth, maximum upload and/or download bandwidth, latency, jitter, reliability such as acceptable packet loss rate. Advantageously, this set of technical parameters is associated with a quality of service offering that does not require special technical expertise by the service provider 10. Such technical parameters are therefore only exchanged internally within the network 20. Thus, the first server 22 can store a mapping between the service provider identifier and the set of technical parameters. For this purpose, the database has sets of technical parameters related to quality of service offerings subscribed to by each of the third-party service providers.

In step 203, a first session initiation request is sent from the second server 12 to the first server 22, via the QoS API according to the HTTP protocol, the initiation request comprising at least the identifier of the service provider 10. Such an identifier may, for example, be included in an XML file.

Other information described below may be included in the XML file (particularly the identifier of the requested service and/or information on the requested quality of service).

Using at least the identifier of the service provider 10, the first server 22 can access its database where the aforementioned mappings are stored, in order to obtain, in step 204, the set of technical parameters associated with the user identified in the first request.

In step 205, a second session initiation request is generated from the obtained set of technical parameters. The technical parameters may be converted to Diameter elements in the second request, which can then be transmitted to the PCC server 23 via the Rx interface in step 206.

The first server 22 thus translates the session initiation requests received in the QoS API interface into technical parameters applicable by PCC, unlike the approach of the prior art where the first initiation request must contain the set of parameters expected by the PCC server 23.

Thus, compared to the prior art described in the introductory section, the present invention relieves the service provider 10 from having to specify a set of technical parameters that are only necessary so that the network operator can provide in the network 20 a quality of service subscribed to by the service provider 10. The network operator 20 is thus responsible for translating a quality of service offering contracted to the service provider 10 into technical parameters applied in the network 20, which ensures that the technical parameters are properly configured.

As previously described, the first session initiation request includes an XML file comprising at least the identifier of the service provider 10. The identifier of the service provider may be a "TSP-Id" parameter ("Third-party Service Provider Identifier"). Such a parameter is present in a destination URL of the first initiation request, in the following form for example:

http://QoSAPI.com/?TSP-Id.

The following information, in accordance with the XML language, may also be included in said XML file:

RequestType: This information allows the second server 12 to specify to the first server 22 whether the request is an initiation request (case detailed above) or a request to modify a previously sent request (detailed below). For an initiation or creation request, "RequestType" has the value "creation", and for a modification, "RequestType" has the value "change" with an associated session identifier "SessionID" described below;

SessionID: This information identifies the session in the QoS API and Rx interfaces. It may be created in an optional step 207 by the first server 22 upon receipt of the first initiation request (step 203). The session identifier can be constructed from the following:
a Diameter identifier of the service provider 10;
TimeStamp: timestamp data referencing the start of the session (for example a 32-bit value);
an element, which may be 32-bit, to allow differentiating between two sessions initiated at the same time.

The session identifier may be added to an HTTP message to be transmitted to the second server 12 in step 208. An example format for the session identifier can be: 3rdSP.orangeApi.com;20130521090;3541687154. The HTTP message may contain only the following portion 20130521090;3541687154 which is necessary for the first server 22 to find the session;

UeID: This information specifies the identity of the user terminal (User Equipment). This information may be an IP address assigned to the user by the network operator 20 and allows identifying a user session in a context of issuing a quality of service change request. Based on this user ID and upon receiving a quality of service change request, in step 209, the second server 12 can determine the session ID of the user concerned, and can thus insert the session ID into a quality of service change request to be sent to the PCC server 23;

QoSLevel: This information on the requested quality of service level can be used to simplify a request for a specific quality of service level when the service provider 10 is initiating a session for its users. In a context where the service provider 10 does not offer a service differentiated according to user class (a context called B2B, for "Business to Business"), such information is optional. For example, for a specific musical event where the music streaming service provider is a partner of the artist, the service provider can make a special request for a quality of service for listening to the music of this artist without discriminating between users of the service.

In a context where users are differentiated into classes by the service provider 10 (a context called B2B2C, for "Business to Business to Consumer"), information on the requested quality of service level can be used to discriminate between users. For example, a music streaming service provider may offer a premium service with high-definition HD listening quality and a non-premium service with standard SD listening quality. For this purpose, the information on the requested quality of service level may have the value "TSP_premium" for the HD quality desired for a first class of users, or "TSP_nonpremium" for the desired SD quality for a second class of users;

ServiceClass: This information, which is a requested service identifier, is optional and can allow a service provider to offer different types of services (VoIP—"Voice over IP", games, streaming services, instant messaging, etc.) requiring different sets of technical parameters. The service provider 10 can thus specify the type of service supported for a certain session (identified by the session identifier). The first server 22 can thus apply different technical parameters for each of the current services requested by users. In cases where such information is not specified in the XML file, all media (text, image, video, audio) for the current session have the same quality of service in the network 20;

SponsoredConnectivityData: this information allows the service provider 10 to bear any additional cost so that its users can access its services, regardless of the contracted package the users have with the network operator 20;

Start/End: This information, including a start time, serves to place a request from the service provider 10 on hold when a session is not to be initiated immediately. Such information is used to delay the initiation of a session, and the second initiation request is transmitted to the PCC server 23 at the moment of the start time specified in the first initiation request. Such information can also be used in the case of a quality of service change request, to postpone the time at which the change should be taken into account.

Figure 3:
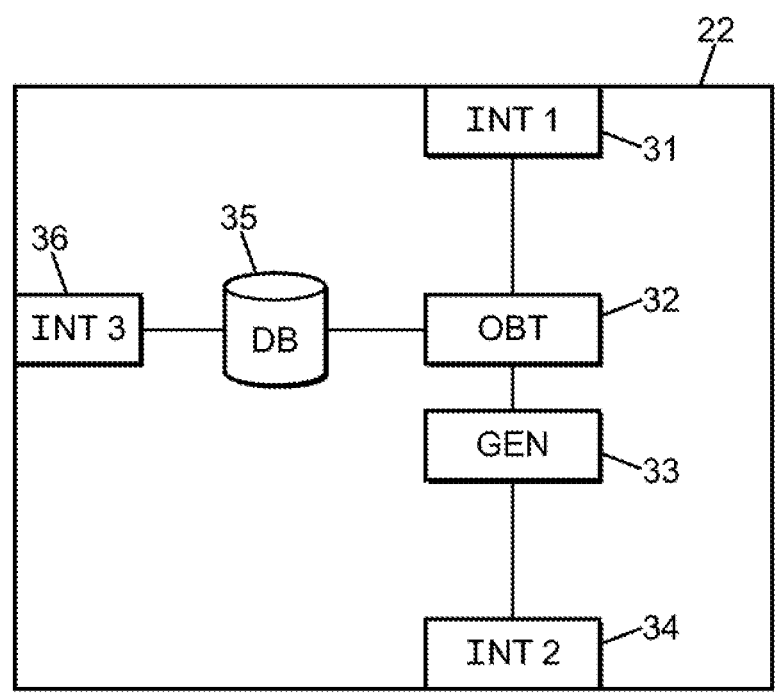
FIG. 3 illustrates the structure of a server of a telecommunications network according to an embodiment of the invention.

FIG. 3 shows a server of a telecommunications network, such as the first server 22 illustrated in FIG. 2.

The first server 22 comprises a first interface 31 corresponding to the QoS API interface presented above, by which the first server can communicate with the second server 12 of the service provider 10. The first interface 31 is adapted to receive the first session initiation request comprising at least the service provider identifier (in an XML file, for example, as previously detailed). The first server 22 further comprises a unit for obtaining a set of technical parameters of the network, that are adapted to a quality of service subscribed to by the service provider identified in the first request. Sets of technical parameters may be stored for this purpose in a database 35 with corresponding service provider identifiers.

From the set of technical parameters obtained, a second initiation request may be generated by a generation unit 33. As previously detailed, the second request may comply with the Diameter protocol to enable transmission over the Rx interface with the PCC server 23. For this purpose, the first server 22 further comprises a second interface 34 adapted to transmit the second initiation request to the PCC server 23. Several interfaces 34 may be instantiated, because the server is not necessarily limited to interaction with a single PCC server. For example, it is conceivable to have instantiation with two servers 23, which can be a PCC server and a CDN server for a streaming service, or a PCC server and a web optimization server for a web browsing service.

A third interface 36 allows the information system 21 of the network 20 to access the database 35 to ensure that the data stored in the database 35 are current and in accordance with a subscription, modification, or termination requested by the service provider 10 via the information system 21.

Thus, the QoS API interface presented above is attractive for a service provider 10 in comparison to the prior art presented in the introduction. Indeed, this maximizes the reduction in complexity for the service provider 10 to use such an interface, to the extent that the parameters (possibly a single service provider identifier) to be specified in the first request are simplified and that understanding the parameter(s) is made easier because less specific to the network 20. In addition, the service provider 10 has the guarantee that its request (session initiation or quality of service modification) is enriched by the first server 22 in a manner consistent with an offering previously subscribed to by the network operator 20.

By making the interface between service provider 10 and network 20 more attractive for the service provider 10, the network operator 20 can thus develop new service offerings which complement the existing, generally more end-user oriented offerings. Cooperation between service provider and operator is thus reinforced and enriched. In addition, service providers can enhance the segmentation of offered services by differentiating the quality of service provided between different classes of user.

The proposed interface is also compatible with a B2B context in which the service provider requires that a quality of service be provided regardless of the service offering from the service provider to the user, and a B2B2C context in which the service provider requires a quality of service associated with a profile of a user with the service provider.

Of course, the invention is not limited to the embodiments described above as an example, but may extend to other variants.

Thus, an embodiment was described in which the technical parameters of the network, obtained by the first server 22 from a service provider identifier, are promptly sent by the server 22 to the resource control server 23 (for example a PCC server) of the telecommunications network, and possibly to one or more other servers of the telecommunications network (for example a web optimization platform or a content distribution platform such as CDN) depending on the case. Another embodiment is also possible, however, in which the first server 22 sends these technical parameters to one of these other telecommunications network servers, without sending them to the resource control server 23 of the network, depending on the application context concerned.

The invention claimed is:

1. A method for adapting the quality of service applied in a telecommunications network, wherein the method is implemented in a first server of the telecommunications network and comprises the following steps:
    receiving a first session initiation request from a second server of a service provider, said first request comprising a service provider identifier;
    obtaining, from the service provider identifier, a set of technical parameters of the network that are adapted to a quality of service subscribed to by said service provider identified in the first request;
    generating a second session initiation request, said second request comprising the set of adapted technical parameters;
    transmitting said second session initiation request to a resource control server of the telecommunications network.

2. The method according to claim 1, wherein obtaining the set of technical parameters comprises accessing a database which maps each provider identifier among a plurality of provider identifiers to at least one set of technical parameters of the network.

3. The method according to claim 1, wherein:
    the first request further comprises information concerning the requested quality of service level,
    a set of specific technical parameters is associated with each requested quality of service level for a given service provider, and
    upon receipt of the first request comprising a service provider identifier and information concerning the requested quality of service level, a second session initiation request is generated, comprising the set of technical parameters adapted to the requested quality of service level and to the service provider identified in the first request.

4. The method according to claim 1, wherein:
    the first request further comprises a requested service identifier,
    a set of specific technical parameters is associated with each requested service for a given service provider,
    upon receipt of the first request comprising a service provider identifier and a requested service identifier, a second session initiation request is generated that comprises the set of technical parameters adapted to the requested service and to the service provider identified in the first request.

5. The method according to claim 1, further comprising, upon receipt of the first session initiation request, the following steps:
    creating a session identifier comprising timestamp data and a unique identifier;
    transmitting the session identifier to the second server of the service provider, enabling said second server to generate a quality of service change request for the identified session.

6. The method according to claim 1, wherein:
    the first session initiation request further comprises a start time; and
    the second session initiation request is sent to the resource control server at the start time contained in the first request.

7. The method according to claim 1, comprising the following initial steps:
   receiving a request to subscribe to a desired quality of service in the telecommunications network, from the second server of the service provider, said request to subscribe comprising a service provider identifier and said quality of service being defined by a set of technical parameters of the network; and
   storing, in a database, a mapping between the service provider identifier and the set of technical parameters of the network.

8. The method according to claim 1, wherein the technical parameters include one of the following elements, or any combination of the following elements:
   minimum bandwidth for upload and/or download;
   maximum bandwidth for upload and/or download;
   latency;
   jitter.

9. The method according to claim 1, wherein the first request is an HTTP POST request comprising an XML file, said XML file comprising the first service provider identifier, and wherein the second request is a Diameter request.

10. The method according to claim 1, further comprising the following steps:
    generating at least one third session initiation request, said at least one third request comprising the set of adapted technical parameters;
    transmitting said at least one third session initiation request to at least one second server of the telecommunications network, this server being distinct from the resource control server.

11. A non-transitory computer readable storage medium, with a program stored thereon, said program comprising instructions for implementing the method according to claim 1, when the program is executed by a processor.

12. A server for adapting the quality of service applied in a telecommunications network, wherein said server comprises:
    a receiving unit for receiving a first session initiation request from a server of a service provider, said first request comprising a service provider identifier;
    an obtaining unit for obtaining a set of technical parameters of the network that are adapted to a quality of service subscribed to by said service provider identified in the first request by the service provider identifier;
    a generation unit for generating a second session initiation request, said second request comprising the set of adapted technical parameters;
    a transmission unit for transmitting said second session initiation request to a resource control server of the telecommunications network.

13. The server according to claim 12, further comprising a database which maps each provider identifier among a plurality of provider identifiers to at least one set of technical parameters of the network.

14. The server according to claim 12, wherein the generation unit is further configured to generate at least one third session initiation request, said third request comprising the set of adapted technical parameters, and wherein the transmission unit is further configured to transmit said at least one third session initiation request to at least one server of the telecommunications network that is distinct from the resource control server.

15. A system for processing data in a telecommunications network, the system comprising a first server of the telecommunications network, a second server of a service provider, and at least one resource control server, said first server of the network being a server according to claim 12.

* * * * *